(12) United States Patent
Khalifa et al.

(10) Patent No.: US 11,892,980 B2
(45) Date of Patent: Feb. 6, 2024

(54) MEMORY OPTIMIZED ALGORITHM FOR EVALUATING DEDUPLICATION HASHES FOR LARGE DATA SETS

(71) Applicant: EMC IP Holding Company LLC, Hopkinton, MA (US)

(72) Inventors: Amro Magdi Mahmoud Sayed Khalifa, Cairo (EG); Angelo Reis, Cork (IE)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/447,901

(22) Filed: Sep. 16, 2021

(65) Prior Publication Data

US 2023/0090289 A1    Mar. 23, 2023

(51) Int. Cl.
*G06F 16/174* (2019.01)

(52) U.S. Cl.
CPC .................. *G06F 16/1748* (2019.01)

(58) Field of Classification Search
CPC .................................................. G06F 16/1748
See application file for complete search history.

(56) References Cited

U.S. PATENT DOCUMENTS

| | | | |
|---|---|---|---|
| 8,099,605 B1* | 1/2012 | Billsrom | H04L 69/40 726/28 |
| 10,572,544 B1* | 2/2020 | Zhang | G06F 16/383 |
| 11,356,409 B1* | 6/2022 | Ng | G06F 9/50 |
| 2012/0054196 A1* | 3/2012 | Marndi | G06F 7/02 707/E17.106 |
| 2012/0084305 A1* | 4/2012 | Inoue | G06F 16/583 707/E17.014 |
| 2020/0192940 A1* | 6/2020 | Tomlinson | G06F 16/9027 |
| 2020/0265034 A1* | 8/2020 | Chalmer | G06F 16/1748 |
| 2021/0064581 A1* | 3/2021 | Wang | G06F 16/1752 |
| 2022/0107921 A1* | 4/2022 | Mayo | G06F 16/1815 |

* cited by examiner

*Primary Examiner* — Cam Y T Truong
(74) *Attorney, Agent, or Firm* — Workman Nydegger

(57) ABSTRACT

One example method includes performing a hash of data to generate a hash value, checking a binary trie to determine if the hash value has previously been entered into the binary trie, if the hash value has previously been entered in the binary trie, declaring the data as a duplicate of other data, and if the hash value has not been previously entered in the binary trie, updating the binary trie to include the hash value.

18 Claims, 4 Drawing Sheets h = 3

Initially

300 { bitArray = [000000000000000]

insert 1

1 = 001 for i = 0, bit = 0, nodeIndex = 1
for i = 1, bit = 0, nodeIndex = 3
for i = 2, bit = 1, nodeIndex = 8

1   3       8

300 { bitArray = [0,1,0,1,0,0,0,0,1,0,0,0,0,0,0]

insert 3

3 = 011 for i = 0, bit = 0, nodeIndex = 1
for i = 1, bit = 1, nodeIndex = 4
for i = 2, bit = 1, nodeIndex = 10

1   4     10

300 { bitArray = [0,1,0,1,1,0,0,0,1,0,1,0,0,0,0]

MEMORY OPTIMIZED ALGORITHM FOR EVALUATING DEDUPLICATION HASHES FOR LARGE DATA SETS

FIELD OF THE INVENTION

Embodiments of the present invention generally relate to deduplication. More particularly, at least some embodiments of the invention relate to systems, hardware, software, computer-readable media, and methods for storing and retrieving hashes generated in connection with a deduplication process.

BACKGROUND

In some data deduplication processes, or simply, deduplication, a piece of data, such as a chunk or block for example, is hashed and the resulting hash stored. When an additional piece of data is received, it is hashed and the resulting hash compared with the stored hash. If the hashes match, that is, if the hashes are duplicates of each other, it can be concluded that the additional piece of data is the same as the piece from which the initial hash was generated. In this way, storage of the additional piece of data is unnecessary and, instead, a lightweight pointer can be stored that points to the data chunk or block that was used to generate the initial hash. Then, when a request is received for the additional piece of data, the data that was the basis for the generation of the first hash can be returned by using the pointer. While this scheme provides acceptable results in some circumstances and applications, problems may arise.

In general, many deduplication algorithms calculate respective 32-bit integer hashes for each of the data chunks, or other data pieces, processed by the algorithm. As used herein, a 32-bit integer hash refers to a hash that consists of 32 bits, and each of the bits has a value of either 1 or 0. Thus, the total number of all the possible 32-bit integer hashes is 4,294,967,296.

In most programming languages, the typical data structures used to store hashes require an excessive amount of memory to find duplicate hashes. That is, the larger the amount of memory, the more duplicate hashes that can be potentially identified, since the memory stores only unique hashes. However, in most cases, it is impossible or impractical to calculate and store all possible 32-bit integer hashes which, as noted above, number over 4 billion possible hashes.

For example, in the C# programming language, a hash set consumes roughly 3 GB of memory to process only 100 million hashes. Internal memory limitations may prevent the processing of more hashes. Note that this can vary across language versions and compilers, but the variation is limited. Generally, and in the case of other programming languages, the implementations are either impractical, by requiring the use of excessive memory, and/or by not scaling to meet customer requirements.

In sum then, it is impractical, or impossible in some cases, for many modern devices to utilize deduplication processes that use 32-bit integer hashes. In an attempt to solve this problem, typical built-in data structures in most programming languages use excessive memory, as they consume tens or even hundreds of GBs for storing 32-bit integer hashes.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
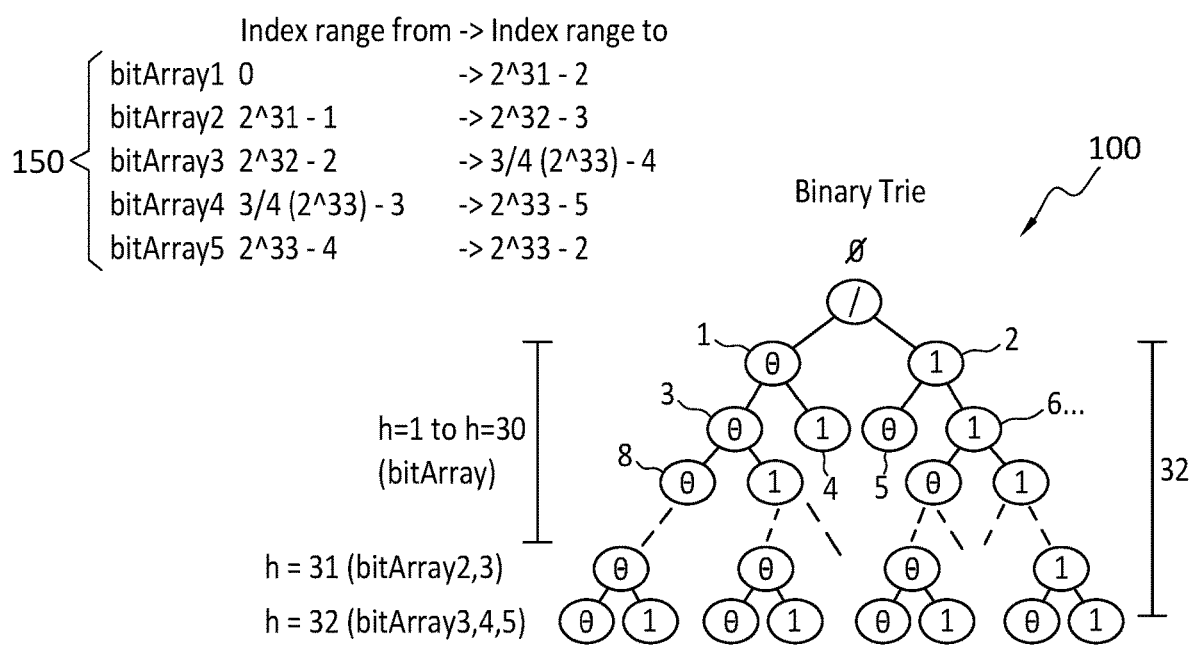
FIG. 1 discloses aspects of an example architecture, including a binary trie, for embodiments of the invention.

Embodiments of the present invention generally relate to deduplication. More particularly, at least some embodiments of the invention relate to systems, hardware, software, computer-readable media, and methods for storing and retrieving hashes generated in connection with a deduplication process.

Deduplication may be important in storage and file systems to identify redundant data and optimize storage requirements. Data are typically processed in chunks and their hashes are compared to decide if they are duplicates of each other. This requires an optimized storage for the hashes, especially if they must be stored in memory. As conventional approaches require tens or hundreds of GB to store all possible hashes based on the implementation, it is impractical to store all possible hashes in memory. Thus, example embodiments of the invention are directed to, among other things, an algorithm, method, system, and device, that uses roughly 1 GB of pre-allocated memory to track all possible 32-bit integer hashes for practical evaluation, such as for comparison with other hashes as part of a data deduplication process for example, in a wide range of systems, methods, and devices.

In some instances, embodiments of the invention may be employed as an element of a data deduplication process. In other instances, embodiments of the invention may be employed to identify possible deduplication targets in advance of the performance of a data deduplication process.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that deduplication processes may be improved, in terms of efficiency, LU identification of duplicate hashes, and speed, through the use of a relatively small memory, such as about 1 GB for example, sized and configured to accommodate all possible 32-bit integer hashes such as may be generated as part of a data deduplication process. An embodiment of the invention may improve the efficiency with which memory is used to track 32-bit integer hashes. An embodiment of the invention may reduce deduplication process memory requirements by omitting the use of pointers and pointer references.

It is noted that nothing herein should be construed as teaching or suggesting that any aspect of any embodiment of the invention could, or would, be performed, practically or otherwise, in the mind of a human. Further, and unless explicitly indicated otherwise, the disclosed methods, processes, and operations, are contemplated as being implemented by computing systems that may comprise hardware and/or software. That is, such methods, processes, and operations, are defined as being computer-implemented.

A. Aspects of Some Example Bit Arrays and Binary Tries

In general, example embodiments include an algorithm that may operate to track hashes, utilizing a binary trie implemented by manipulating bit arrays for optimized memory allocation. The usage of a binary trie may provide constant insertion and retrieval times of O(32) operations. As well, the use of a binary trie may avoid or eliminate the need to use any pointer references and, accordingly, it may be the size of the bit arrays that dictates the memory space requirements.

In one particular embodiment, the algorithm may use a bit array in the form of a binary trie data structure of height 32 that contains all possible 32-bit unsigned integer combinations, roughly 4 billion records, or exactly 4,294,967,296 combinations, where each combination comprises a hash. That is, the number of hashes is determined based on the fact that each hash has 32 bits, each of which has a 1 or 0 value, and the number of hashes is all possible combinations of the different values of the 32 bits. The bit values of each hash may indicated in locations that can be calculated in run time. This embodiment may operate to track the hash representation using bit arrays. Thus, each hash may be decomposed into its 32 bits, and tracked in the bit array.

In terms of memory needed to accommodate all possible 32 bit hashes, the children nodes, in a binary trie structure, of a bit whose index value is 'i' are stored in the bit array indices 2i+1 and 2i+2, calculated at run time. This means that $2^{(n+1)}-1$ indices are needed to accommodate all possible hash values, resulting in a total memory requirement $2^{33}-1$ bits, or only about 1 GB.

With reference now to FIG. 1, details are provided concerning some example elements that may be employed in some embodiments of the invention. As shown there, example embodiments may employ a binary trie 100. In general, the height 'h' of the binary trie 100 may correspond to the number of bits in the hashes generated by a hash algorithm that operates to hash one or more pieces of data, such as data chunks for example, to produce a hash that corresponds to the piece of data that was hashed. The hashing of data may be performed in connection with a data deduplication process. In some embodiments, hashing may be performed as part of the data deduplication process. It is noted that no particular hash algorithm is required for any embodiment. As some example embodiments may employ 32 bit hashes, one particular embodiment of the binary trie 100 may have a height 'h'=32, with $2^{(n+1)}-1$ indices to accommodate all possible hash values. In this example, n=32, so $2^{(32+1)}-1$ indices, or $(2^{33})-1$ indices, used to denote the location of a node in the binary trie, are needed in the binary trie to enable the binary trie track all the bits needed for all possible 32 bit hashes.

As shown in the example of FIG. 1, the children of a node (parent) whose index value is 'i' have index values of i (left child)=2i+1 and i (right child)=2i+2. To illustrate, the children of the node whose index i=1, have the respective indices 2(1)+1=3, and 2(1)+2=4. Similarly, the children of the node whose index i=2, have the respective indices 2(2)+1=5, and 2(2)+2=6. As the illustrated example is a binary trie, each of the nodes can only track or indicate one of two bit values, namely, a bit value of 0, or a bit value of 1.

In the particular example of FIG. 1, a total of 5 bit arrays 150 are employed to store all the bits in an index range of $0 \rightarrow 2^{(33)}-1$, that is, the range covered by the example binary trie 100. The bits may, or may not, be distributed equally amongst the bit arrays 150. As shown, each of the bit arrays 150 stores a respective range of bits. Particularly, bitArray1 stores the bits in the index range from 0 to $2^{(31)}-2$, bitArray2 stores bits in the index range from $2^{(31)}-1$ to $2^{(32)}-3$, bitArray3 stores the bits in the index range from $2^{(32)}-2$ to ¾ $(2^{(33)})-4$, bitArray4 stores the bits in the index range from ¾ $(2^{(33)})-3$ to $2^{(33)}-5$, and bitArray5 stores the bits in the index range from $(2^{(33)})-4$ to $2^{(33)}-2$.

With continued reference to FIG. 1, aspects of the relationship between the binary trie 100 and the bit arrays 150 are indicated. It is noted that due to programming, and/or other, considerations, there may be a limit, in some cases, to the number of values that can be stored in a bit array. Thus, while a single bit array may, in some cases, be able to store all the bits of all possible hash values, other circumstances may require the use of multiple bit arrays to store all the bits of all possible hash values. One example of the use of multiple bit arrays is shown in FIG. 1.

In general, and as can be seen in the binary trie 100, the levels of the binary trie 100 steadily increase in terms of the number of bits that they hold. Thus, level h1 of the binary trie 100 may track 1 bit, or $2^0$ bits, while level h32, may track $2^{31}$ bits. Accordingly, the bitArray1 150 may be able to store all the bits in levels h1 to h30. Subsequent bit arrays 150 may be able to store the same number of bits, but more bit arrays 150 will be required due to the increasing size of the levels in the height 'h' of the binary trie 100.

Thus, bitArray2 and part of bitArray3 may be needed just to store the bits in level h31. Similarly, the remaining portion of bitArray3, along with bitArray4 and bitArray5, may be needed to store all the bits of level h32. Put another way, the number of nodes at height h of a binary trie is $2^h$ so, for h=31, $2^h=2^{31}$ nodes or bits are needed. Since the capacity of a bit array in this example is $2^{31}-1$, one more node is needed to store the bits. This is the reason for using bitArray2, along with one bit from bitArray3. The rest of bit array 3, along with bit arrays 4 and 5, contributes to h=32.

Figure 2:
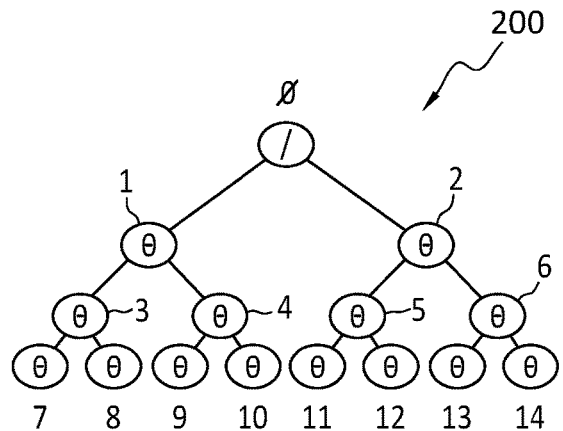
FIG. 2 discloses another example binary trie, as well as a bit array, according to some example embodiments.
Figure 2:
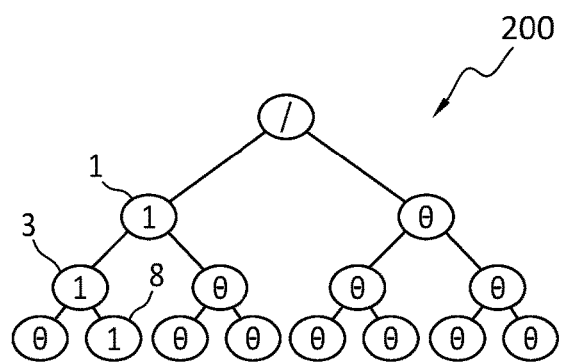
Figure 2:
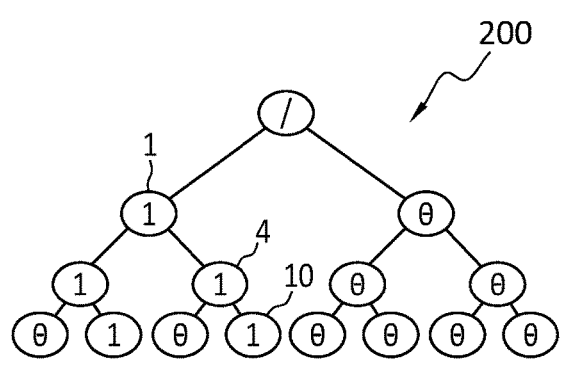

Turning next to FIG. 2, further details are provided concerning an example Lu binary trie 200 and associate bit array 300. In this illustrative example, the binary trie 200 has a height h=3, and a total of 15 nodes distributed over 4 levels. The height h=3 means that only 3 bit hashes can be inserted into the binary trie 200. Thus, to enable insertion of 32 bit hashes, a binary trie would have a height h=32. Thus, the first bit of a hash is reflected at a node on the first level of the binary trie, the second bit of the hash is reflected at a node on the second level of the binary trie, continuing on until the $32^{nd}$ bit of the hash, which is reflected at a node on the bottom, or $32^{nd}$ level, of the binary trie.

As shown, the binary trie 200 may have all nodes set to an initial value of 0. This may be done, for example, prior to the start of a data deduplication process. The bit array 300, in correspondence with the number of nodes in the binary trie 200, holds 15 binary values in the order in which those values appear in the nodes of the binary trie 200. Thus, the bit array 300 corresponding to the binary trie 200 consists of the binary trie 200 values [0,0,0,0,0,0,0,0,0,0,0,0,0,0,0], where the first value in the bit array 300 corresponds to the first node of the binary trie 200, the second value in the bit array 300 corresponds to the second node of the binary trie 200, continuing up to the fifteenth node of the bit array 300, which corresponds to the $15^{th}$ node (denoted at '14' in FIG. 2) of the binary trie 200. Note that while the root node is counted as a node of the binary trie 200, the root node is assigned the number '0'.

Next, suppose that a 3 bit hash '001' is created as part of a data deduplication process. That hash may be inserted into the binary trie 200 by changing the corresponding node values of the binary trie 200, beginning at the first node 0. The first bit (i=0) of the hash is 0, so the value of node 1 (the child node to the left of node 0) is set to 1, to indicate that the hash includes, as its first bit, the value 0. Put another way, by setting the value of node 1 from 0 to 1, an affirmative indication is given that a hash has been seen whose first bit has a value of 0. Since the second bit (i=1) of the hash is also 0, the value of node 3 (the child node to the left of node 1) is set to 1 as well.

Thus, and taking node 1 as an example, the value at node 1 (corresponding to the first bit of a hash) can be considered as indicating 1 of 2 conditions. Namely, if the value is 0, then no hash has yet been seen whose first bit is 0. On the other hand, if the value is 1, then that indicates that at least one hash has been seen whose first bit is 0. Thus, when no hashes have been seen yet, all node values in the binary trie 200 will be 0, and when all hashes have been seen, all node values in the binary trie 200 will be 1.

Finally, the third bit (hash bitIndex i=2) of the hash is 1. In this case, the value of node 8 (the child node to the right of node 3) is set to 1. In general then, when a value of a bit in a hash is 0, movement in the binary trie is to the left child, and when a value of a bit in a hash is 1, movement in the binary trie is to the right child.

Because some of the node values in the binary trie 200 have changed due to insertion of the 3 bit hash 001, the bit array 300 may be correspondingly updated. Thus, the bit array 300, as updated to reflect the binary trie 200 changes due to insertion of the hash value, now consists of the binary trie values [0,1,0,1,0,0,0,0,1,0,0,0,0,0,0]. That is, the values of the bit array 300 elements 1, 3, and 8, have been changed from 0 to 1, to reflect the changes to the values of nodes 1, 3, and 8, in the binary trie 200.

A similar approach may be taken for insertion of the 3 bit hash '011.' In this case, the binary trie 200 has previously been updated to indicate that the hash 001 has been seen. Thus, the starting point for insertion of the hash 011 is the binary trie 200 as it has been previously updated to reflect insertion of the hash 001.

The first bit (hash bitIndex i=0) of the hash 011 is 0, so the value of node 1 on the left side of the binary trie 200 should be set to 1, where the node value 1 indicates that a first bit value of 0 has been seen. In this case, however, the value of node 1 was previously set to 1, to indicate that a hash with a first bit value of 0, namely, hash 001, has already been seen. Thus, entry of the hash 011 does not require a change to the value of node 1.

The second bit (hash bitIndex i=2) of the hash 011 is 1. Accordingly, the value of the right child node of node 1, that is, node 4 of the binary trie 200, must be updated to reflect that a hash whose first bit is 0 and whose second bit is 1, has been seen. That is, the value of node 4 is changed from 0 to 1, as shown in FIG. 2. Because the third bit (hash bitIndex i=3) of the hash 011 is also 1, the value of the right child node of node 4, that is, node 10 of the binary trie 200, must be updated to reflect that a hash whose first bit is 0, whose second bit is 1, and whose third bit is 1 has been seen. That is, the value of node 10 is changed from 0 to 1.

Correspondingly, after entry of the hash 001 and 011, the bit array 300 now consists of the binary trie 200 values [0,1,0,1,1,0,0,0,1,0,1,0,0,0,0]. That is, the values of the bit array 300 elements 4 and 10 have been changed from 0 to 1, to reflect the changes to the values of nodes 4 and 10 in the binary trie 200. No changes have been made to the value of element 1 since, for both the hash 001 and 011, the first bit has the same value, namely, 0.

If it should happen that a duplicate hash is identified for insertion in the bottommost level of the binary trie. For example, even if the first 2 bits of a 3 bit hash have already been seen, it cannot be ascertained that the entire 3 bit hash has, or has not, been seen previously until the last bit of the hash, corresponding to the bottom level of the binary trie, has been checked. Note that it is not necessary in all cases that all levels of a binary trie be checked.

To briefly sum up various points concerning the illustrative examples in FIG. 2, an algorithm, method, and process, may walk the binary trie 200 and the bit array 300 and enable, that is, modify the values of, the positions that match the bits of the hashes. In the case of the first 32 bit hash, for example, after the binary trie 200 node values have been set, there will be 32 positions set to 1, meaning that those nodes were each visited by a respective bit of the 32 bit hash during a hash verification process. When another hash comes in, the same general verification process is performed. If all the bits of the hash in the binary trie 200 and bit array 300 being verified are already set to 1, then the it may be concluded that the hash is a duplicate. However, if any bit of the hash in the binary trie 200 and bit array 300 was still set to 0, the algorithm may still continue to verify the hash to the end, enabling the bits of the hash in the binary trie 200 and bit array 300, but the presence of a 0 in any of the nodes checked for that hash means that the hash is not a duplicate.

B. Example Methods

Figure 3:
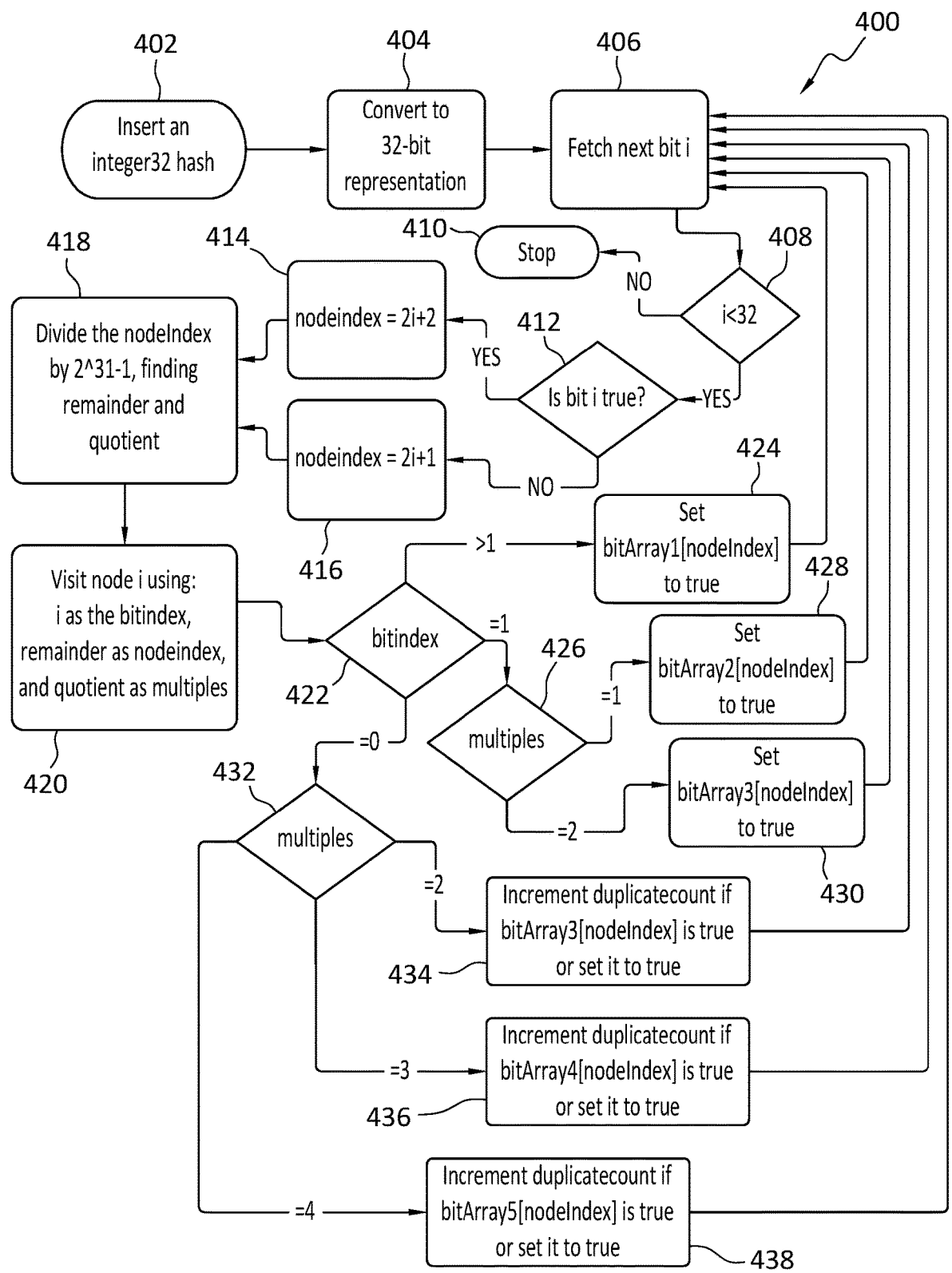
FIG. 3 discloses aspects of an example method for memory optimized evaluation of deduplication hashes for large data sets.

It is noted with respect to the example method of FIG. 3 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Directing attention now to FIG. 3, aspects of a method 400 are disclosed for using a binary trie and bit array to determine whether or not a particular hash, such as may be generated in connection with a data deduplication process, has been seen before. That is, the binary trie node values may be expressed as a bit array that is used to record if a hash has been seen before. In this example, a binary trie of h=32 may be used. As such, only hashes of 32 bits can be verified using this example binary trie. Due to its height, the binary trie contains all possible combinations of a 32 bit number. That is, the binary tree contains all possible 32 bit hashes, or at least contains the number of nodes needed to check all possible 32 bit hashes to determine if the hashes have been Lu seen before or not.

As shown in FIG. 3, the example method 400 may be performed in connection with a total of 5 bit arrays, although more or fewer bit arrays may be employed in other embodiments. Further, hashes having more, or fewer, than 32 bits may be employed in other embodiments.

The method 400 assumes, for example, the use of 32 bit hashes. As such, the method 400 may begin at 402 where a command may be received to insert an integer 32 hash in a binary trie/bit array. The hash may be converted 404 to a 32 bit representation that may be used to update the binary trie and bit array. The next bit of the hash, which may be the first bit (hash bitIndex i=1) may be fetched 406. If it is determined 408 that the hash bitIndex is not <32, then the method 400 may stop 410, since this means all the bits have been checked. In any other case, the method 400 may continue and a check 412 performed to determine if the bit is true or not, that is, whether or not the bit is a 0 or a 1. If 0, the method proceeds to 414 to identify the left child node that will be updated, and if 1, the method proceeds to 416 to identify the right child node that will be updated.

In either case of 414 or 416, the nodeIndex, that is, the node number, may be divided 418 by ((2^31)−1) to find a remainder, and a quotient. The node of the binary trie may then be visited 420 using i as the hash bitIndex I, or simply bitIndex, the remainder as nodeIndex, and the quotient as multiples.

Next, a check 422 may be performed of the bitIndex value. If the bitIndex value is >1, bitArray1 (nodeIndex) may be set 424 to true, and the method may then return to 406. If the bitIndex=1, a multiples check 426 may be performed and, if=1, bitArray2 (nodeIndex) may be set 428 to true, and the method may then return to 406. Finally, if the multiples check 426 indicates multiples=2, then bitArray3 (nodeIndex) may be set 430 to true, and the method may then return to 406.

If the bitIndex=0, then a multiples check 432 may be performed and, if =2, a process 434 may increment duplicatecount if bitArray3 (nodeIndex) is true, or the bitArray3 (nodeIndex) set to true if it is not already, and the method may return to 406. If the multiples check 432 indicates=3, a process 436 may increment duplicatecount if bitArray4 (nodeIndex) is true, or the bitArray4 (nodeIndex) set to true if it is not already, and the method may return to 406. Finally, if the multiples check 432 indicates=4, a process 438 may increment duplicatecount if bitArray5 (nodeIndex) is true, or the bitArray5 (nodeIndex) set to true if it is not already, and the method may return to 406.

Thus, the method 400 may iterate until all the hash bitIndex i values have been checked. That is, the method 400 may be performed once for each bit of a hash.

C. Example Algorithm

Following is an example algorithm that embodies the method of FIG. 3, discussed above.

```
using System;
using System.Collections;
using System.Collections.Generic;
using System.Text;
namespace LiveOptics.Dossier
{
  public class MemoryOptimizedHashDedup
  {
    public uint DuplicateCount { get; set; }
    public BitArray bitArray1 = new BitArray(int.MaxValue);
    public BitArray bitArray2 = new BitArray(int.MaxValue);
    public BitArray bitArray3 = new BitArray(int.MaxValue);
    public BitArray bitArray4 = new BitArray(int.MaxValue);
    public BitArray bitArray5 = new BitArray(3);
    public void Insert(uint number)
    {
      var numberBitArray = ToBitArray(number);
      long nodeIndex = 0;
      for (int i = 31; i >= 0; i--)
      {
        var bit = numberBitArray[i];
        nodeIndex = bit == true ? (2 * nodeIndex + 2) :
        (2 * nodeIndex + 1);
        long remainder, quotient = Math.DivRem(nodeIndex,
    int.MaxValue, out remainder);
        SetNodeAsVisited(i, (int)remainder, (int)quotient);
      }
    }
    private void SetNodeAsVisited(int bitIndex, int nodeIndex,
    int multiples)
    {
      if (bitIndex > 1)
      {
        bitArray1[nodeIndex] = true;
      }
      else if (bitIndex == 1)
      {
        if (multiples == 1)
          bitArray2[nodeIndex] = true;
        else if (multiples == 2)
          bitArray3[nodeIndex] = true;
      }
      else if (bitIndex == 0)
      {
        if (multiples == 2)
        {
          if (bitArray3[nodeIndex] == true) DuplicateCount++;
          bitArray3[nodeIndex] = true;
        }
        if (multiples == 3)
        {
          if (bitArray4[nodeIndex] == true) DuplicateCount++;
          bitArray4[nodeIndex] = true;
        }
        if (multiples == 4)
        {
          if (bitArray5[nodeIndex] == true) DuplicateCount++;
          bitArray5[nodeIndex] = true;
        }
      }
    }
    private BitArray ToBitArray(uint number) =>
      new BitArray(BitConverter.GetBytes(number));
  }
}
```

D. Further Discussion

As will be apparent from this disclosure, example embodiments may provide various useful features and functionalities. For example, an algorithm may operate to tracks all unsigned 32-bit integers in 1 GB of memory, allowing the algorithm to be used in many computing systems and computing hardware where checking for deduplication has not been possible due to the inability of memory to store all possible 32 bit hashes. As another example, and to maximize memory efficiency, the algorithm may not require the use of any pointer references, whether 64 or 32 bits, thus allowing the locations of hashes to be decided at runtime. Finally, embodiments of the invention may be used to analyze for deduplication in storage and file systems and optimize the storage requirements for such systems.

E. Further Example Embodiments

Following are some further example embodiments of the invention. These are presented only by way of example and are not intended to limit the scope of the invention in any way.

Embodiment 1. A method, comprising: performing a hash of data to generate a hash value; checking a binary trie to determine if the hash value has previously been entered into the binary trie; if the hash value has previously been entered in the binary trie, declaring the data as a duplicate of other data; and if the hash value has not been previously entered in the binary trie, updating the binary trie to include the hash value.

Embodiment 2. The method as recited in embodiment 1, wherein when the binary trie is updated to include the hash value, a bit array corresponding to the binary trie is also updated to reflect the hash value.

Embodiment 3. The method as recited in embodiment 2, wherein the binary trie comprises a plurality of nodes, and the bit array consists of all node values of the binary trie.

Embodiment 4. The method as recited in any of embodiments 1-3, wherein the binary trie has a value of h=32, and the binary trie occupies no more than 1 GB of memory.

Embodiment 5. The method as recited in any of embodiments 1-4, wherein the hash is a 32 bit hash.

Embodiment 6. The method as recited in any of embodiments 1-5, wherein when the data is determined to be a duplicate, the data is not stored in storage.

Embodiment 7. The method as recited in any of embodiments 1-6, wherein when the data is determined not to be a duplicate, the data is stored in storage.

Embodiment 8. The method as recited in any of embodiments 1-7, wherein the method is performed without the use of pointer references to data.

Embodiment 9. The method as recited in any of embodiments 1-8, wherein the binary trie is checked for the hash at runtime.

Embodiment 10. The method as recited in any of embodiments 1-9, wherein the data is part of a deduplication data stream.

Embodiment 11. A method for performing any of the operations, methods, or processes, or any portion of any of these, disclosed herein.

Embodiment 12. A computer readable storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable LU instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in LU any other suitable environment. Suitable operating environments for at least some embodiments of the invention include cloud computing environments where one or more of a client, server, or other machine may reside and operate in a cloud environment.

Figure 4:
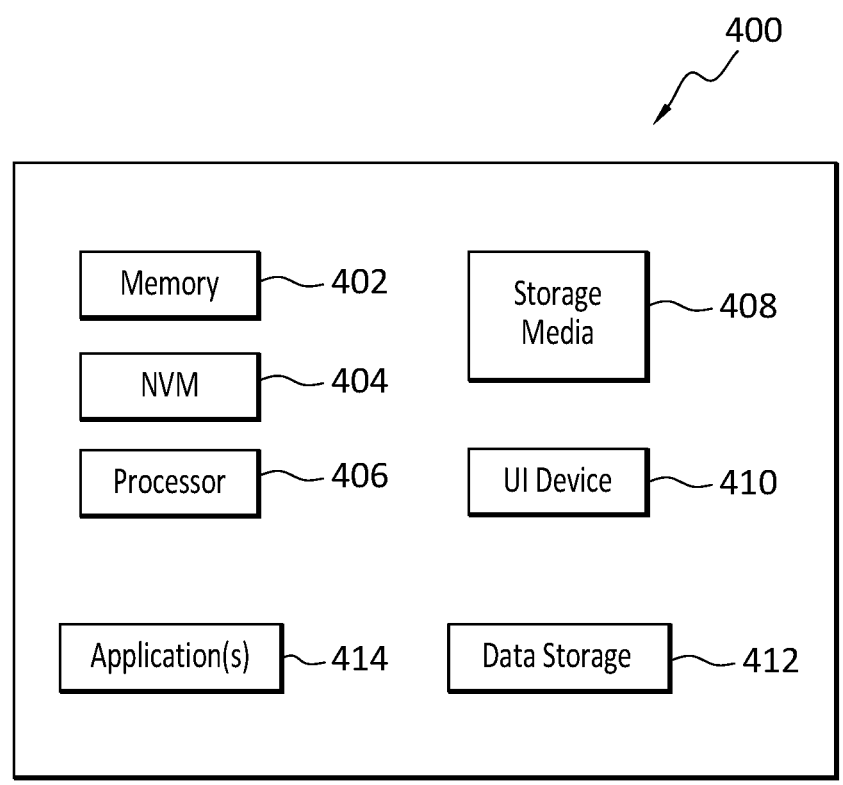
FIG. 4 discloses aspects of an example computing entity operable to LU perform any of the disclosed methods, processes, and operations.

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
performing a hash of data to generate a hash value;
converting the hash to at least one bit array, wherein a size of the at least one bit array is based on a size of a binary trie;
checking the binary trie to determine if the hash value has previously been entered into the binary trie;
if the hash value has previously been entered in the binary trie, declaring the data as a duplicate of other data; and
if the hash value has not been previously entered in the binary trie, updating the binary trie to include the hash value and the at least one bit array corresponding to the binary trie is also updated to reflect the hash value.

2. The method as recited in claim 1, wherein the binary trie comprises a plurality of nodes, and the at least one bit array consists of all node values of the binary trie.

3. The method as recited in claim 1, wherein the binary trie has a value of h=32, and the binary trie occupies no more than 1 GB of memory.

4. The method as recited in claim 1, wherein the hash is a 32 bit hash.

5. The method as recited in claim 1, wherein when the data is determined to be a duplicate, the data is not stored in storage.

6. The method as recited in claim 1, wherein when the data is determined not to be a duplicate, the data is stored in storage.

7. The method as recited in claim 1, wherein the method is performed without use of pointer references to data.

8. The method as recited in claim 1, wherein the binary trie is checked for the hash at runtime.

9. The method as recited in claim 1, wherein the data is part of a deduplication data stream.

10. A non-transitory computer readable storage medium having stored therein instructions that are executable by one or more hardware processors to perform operations comprising:
performing a hash of data to generate a hash value;
converting the hash to at least one bit array, wherein a size of the at least one bit array is based on a size of a binary trie;
checking the binary trie to determine if the hash value has previously been entered into the binary trie;
if the hash value has previously been entered in the binary trie, declaring the data as a duplicate of other data; and
if the hash value has not been previously entered in the binary trie, updating the binary trie to include the hash value and the at least one bit array corresponding to the binary trie is also updated to reflect the hash value.

11. The non-transitory computer readable storage medium as recited in claim 10, wherein the binary trie comprises a plurality of nodes, and the at least one bit array consists of all node values of the binary trie.

12. The non-transitory computer readable storage medium as recited in claim 10, wherein the binary trie has a value of h=32, and the binary trie occupies no more than 1 GB of memory.

13. The non-transitory computer readable storage medium as recited in claim 10, wherein the hash is a 32 bit hash.

14. The non-transitory computer readable storage medium as recited in claim 10, wherein when the data is determined to be a duplicate, the data is not stored in storage.

15. The non-transitory computer readable storage medium as recited in claim 10, wherein when the data is determined not to be a duplicate, the data is stored in storage.

16. The non-transitory computer readable storage medium as recited in claim 10, wherein the non-transitory computer readable storage medium is performed without use of pointer references to data.

17. The non-transitory computer readable storage medium as recited in claim 10, wherein the binary trie is checked for the hash at runtime.

18. The non-transitory computer readable storage medium as recited in claim 10, wherein the data is part of a deduplication data stream.

* * * * *